Oct. 7, 1952     F. J. KUMMETH     2,612,864
NESTING BOX
Filed Jan. 4, 1949     2 SHEETS—SHEET 1
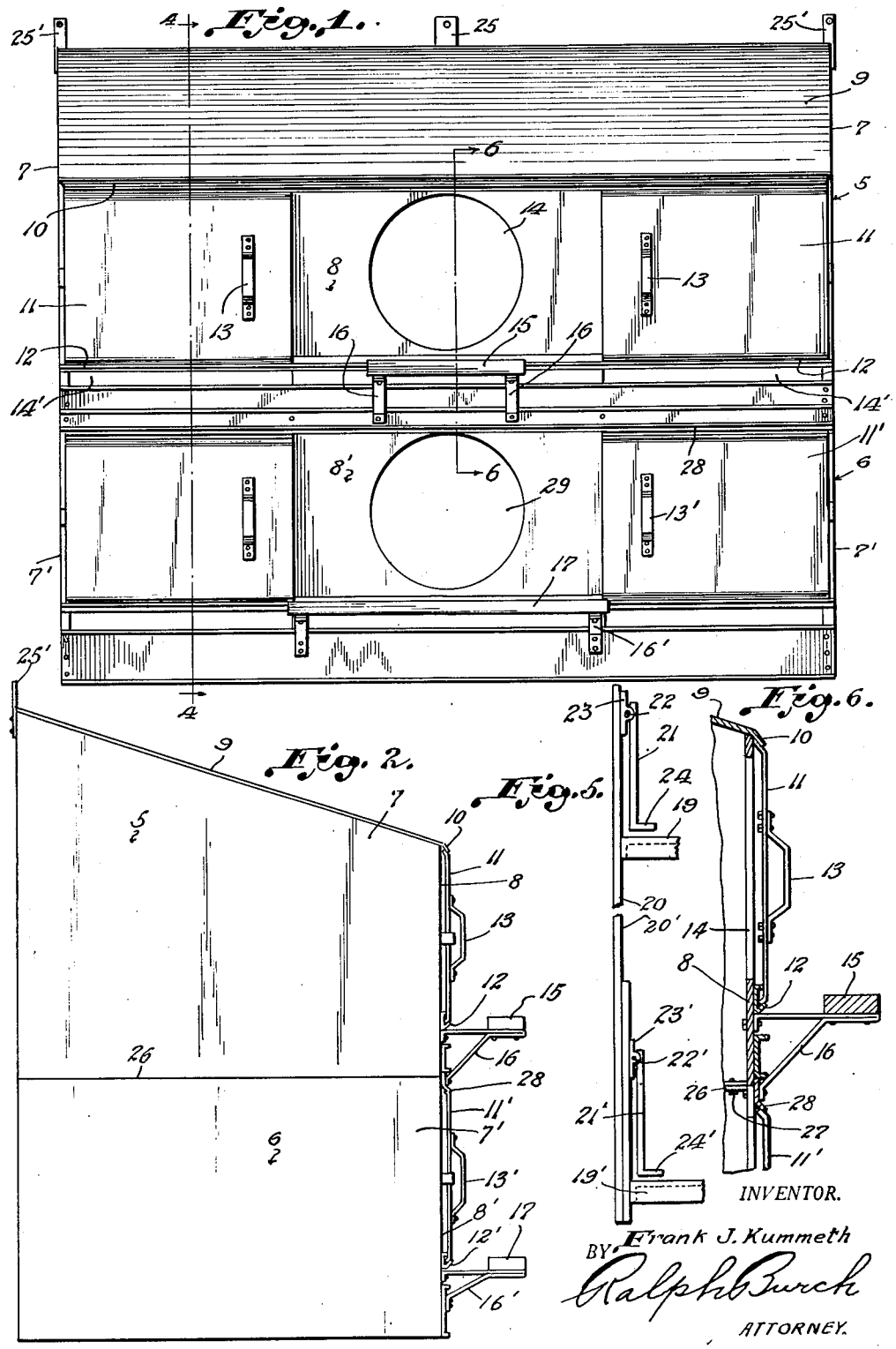
INVENTOR.
Frank J. Kummeth
BY Ralph Burch
ATTORNEY.

Oct. 7, 1952 — F. J. KUMMETH — 2,612,864
NESTING BOX
Filed Jan. 4, 1949 — 2 SHEETS—SHEET 2
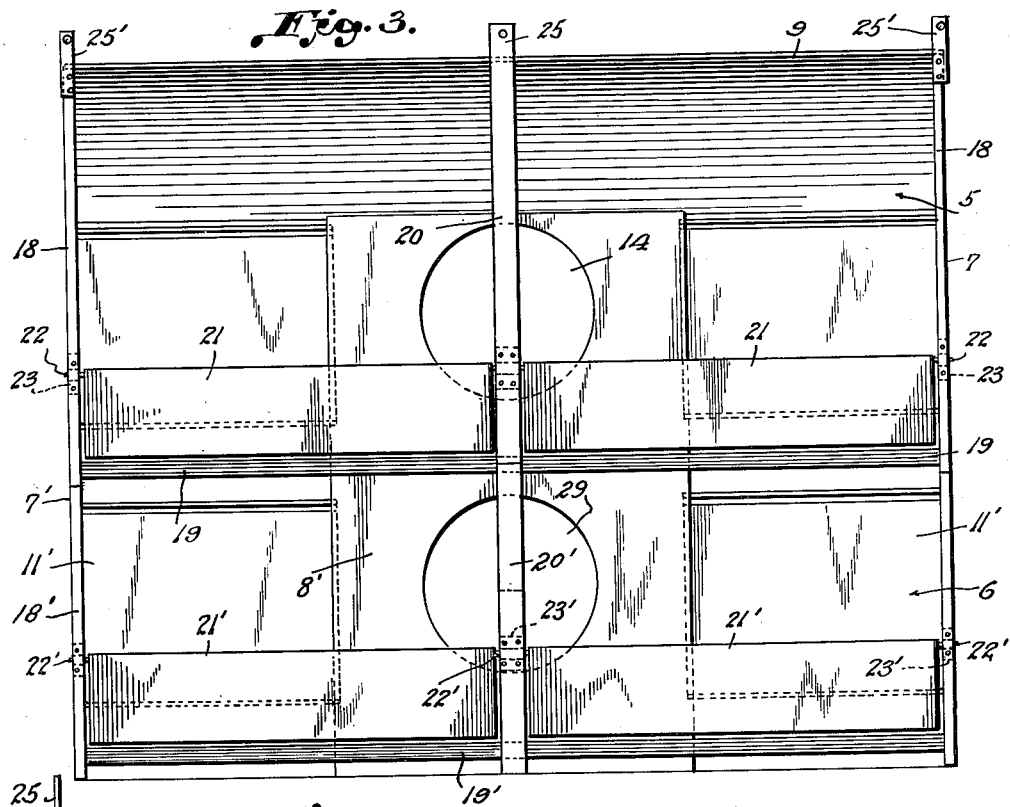
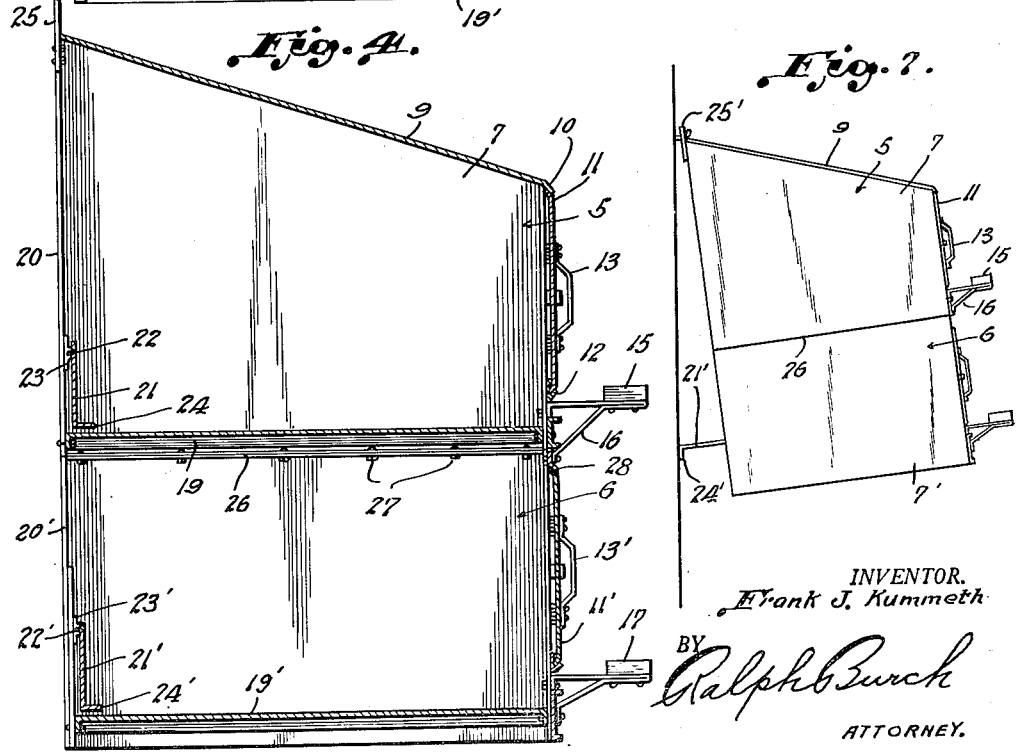
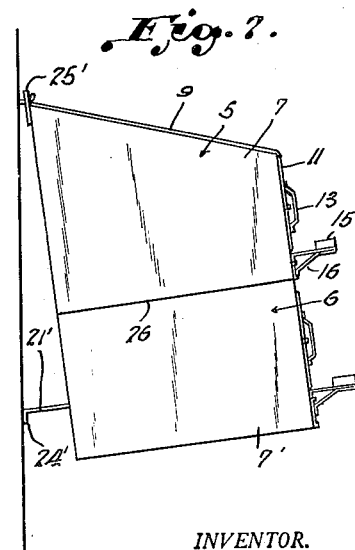
INVENTOR.
Frank J. Kummeth
BY Ralph B. Burch
ATTORNEY.

Patented Oct. 7, 1952

2,612,864

UNITED STATES PATENT OFFICE 2,612,864

NESTING BOX

Frank J. Kummeth, Owatonna, Minn.

Application January 4, 1949, Serial No. 69,091

3 Claims. (Cl. 119—45)

This invention relates to improvements in nesting boxes for hens and more particularly a colony nesting box for accommodating a number of laying hens at the same time.

It is an object of the invention to provide a nesting box having a single entrance arranged in the center to permit ingress and egress of the hens to and from the box without crowding or confusion.

A further object of the invention resides in providing a nesting box having a center entrance and sliding doors at each end to permit easy access to the nests for removing the eggs without disturbing the laying hens.

A still further object of the invention resides in providing a nesting box having ventilation openings arranged to admit fresh air to the lower portion of the nests for cooling the same.

A still further object of the invention resides in providing a nesting box which may be used as a single unit or easily joined with other units to form a tier of boxes, the boxes being provided with perches arranged so the hens may gain access to any of the boxes desired.

A still further object of the invention resides in providing cleaning doors at the back of the boxes which when swung to open position will abut against the wall on which the box is hung and hold the box outwardly from the wall so the litter and dirt may be easily removed when cleaning the nests.

Another object of the invention resides in providing a nesting box which is simple and durable in construction, highly efficient in use and inexpensive to manufacture.

Other objects and advantages of the invention will be apparent during the course of the following description.

In the accompanying drawing forming a part of this specification and in which like numerals are employed to designate like parts throughout the same, Fig. 1 is a front elevation view of the nesting box showing two units joined together, Fig. 2 is an end view of the same, Fig. 3 is a rear view of the same, Fig. 4 is a section taken on line 4—4 of Fig. 1, Fig. 5 is an enlarged detail side elevation view of the cleaning doors, Fig. 6 is a section taken on line 6—6 of Fig. 1, and, Fig. 7 is a side elevation view of the box showing its position when cleaning the nests.

Referring to the drawings wherein for the purpose of illustration I have shown a preferred embodiment of the invention, a pair of nesting boxes 5 and 6 are shown coupled together but if desired a single box may be used or additional boxes may be added depending on the number of hens to be accommodated.

The boxes are constructed of sheet metal, the box 5 having end walls 7 with inclined upper edges and a front wall 8. A downwardly and forwardly inclined top wall or roof 9 is mounted on the upper edges of the end walls 7 having its lower edge extending over the front wall 8 and bent downwardly, as at 10, to form an upper track for the sliding doors 11 which normally cover openings at each end of the front wall. A V-shaped channel iron 12 is secured to the bottom of the front wall 8 and serves as a lower track for the sliding doors. Handles 13 are attached to the sliding doors for moving the doors to open and closed position. An entrance opening 14 is provided in the center of the front wall 8 to permit ingress and egress of the hens to and from the box. This opening is closed by the sliding doors when they are moved to open position to permit access to the nests for removing the eggs. Ventilation openings 14' are provided in the front wall 8 below the sliding doors to admit fresh air to the lower portion of the nests for cooling the same. A perch 15 supported by brackets 16 attached to the front wall is disposed in front of the entrance opening 14.

The back of the box is open and the rear edges of the end walls 7 are bent inwardly to form vertical flanges 18. A floor 19 is mounted in the bottom of each box and extending between the floor and top is a central brace bar 20. A pair of cleaning doors 21 are mounted between the bar 20 and flanges 18 above the floor 19 and have pintles 22 at their ends pivotally mounted in bearing rackets 23 attached to the bar 20 and flanges 18. The lower edges of the doors 21 are bent inwardly to form flanges 24 which form a seal with the floor when in closed position. The upper end of bar 20 extends above the top wall of the box and serves as a hanger 25 while hanger straps 25' are attached to the upper rear corners of the end walls. The hanger 25 and hanger straps 25' serve to suspend the box from hooks attached to the wall of a chicken house or other building. When cleaning the box it is swung outwardly from the wall to which it is attached and the cleaning doors 21 are swung outwardly until the flanges 24 abut against the wall, as shown in Fig. 7, thus holding the box in an angular position to facilitate cleaning of the nests.

The box 6 is similar in construction to the box 5 but has no roof and the side walls 7' having horizontal upper edges with inwardly directed flanges for engagement with corresponding flanges on the lower edges of the end walls 7 of the box 5 to form a joint 26 between the boxes 5 and 6 secured together by fasteners 27. The front wall 8 of box 5 has an angle bar 28 extending along its lower edge forming an upper track for the sliding doors 11' of box 6, while a lower track 12' is secured to the front wall 8' of box 6 adjacent its lower edge. The doors 11' are provided with handles 13'. The front wall 8' is provided with an entrance opening 29 and openings at each end normally covered by the doors 11'. Mounted in front of the opening 29 is a perch 17 supported by brackets 16' attached to the front wall of box 6, which is longer than the perch 15 so the hens may easily ascend from the perch 17 to the perch 15. The back of box 6 is open and has swinging cleaning doors 21' like the doors 21 of box 5. A central bar 20' attached to floor 19' of box 6 is in alinement with the bar 20 of box 5. Bearing brackets 23' are attached to bar 20' and the flanges 18' of the end walls 7' to receive the pintle pins 22' which hingedly mount the doors 21' to swing outwardly. The lower edges of doors 21' are provided with flanges 24' for the same purpose as the flanges 24 of doors 21. The boxes 5 and 6 are normally of a size to accommodate ten hens but any number of boxes may be coupled together to accommodate a greater number of hens.

A nesting box as described permits the hens to enter and leave the nests without crowding and confusion and allows the eggs to be removed from the nests without disturbing the laying hens. The nests are properly ventilated at all times and the box may be cleaned when necessary with the least amount of trouble.

It is to be understood the form of my invention herein shown and described is to be taken as a preferred example of the same and changes in the shape, size and arrangement of the parts may be made without departing from the scope of the subjoined claims.

Having thus described my invention, I claim:

1. A nesting box for suspension from the wall of a chicken house comprising a structure having end walls, a bottom wall and front wall, the front wall having end openings and a center entrance opening, doors slidably mounted on said front wall for longitudinal movement thereof to normally close said end openings, hangers at the rearward upper corners of said end walls for hingedly suspending said structure from the wall of the chicken house, and cleaning doors hingedly mounted on the rearward edges of the end walls above the bottom wall for outwardly swinging movement, said cleaning doors having flanges along their lower edges for engagement with the wall of the chicken house when swung outwardly to hold the structure in spaced relation to the wall when cleaning.

2. A nesting box for suspension from the wall of a chicken house comprising multiple units, each unit having end walls, bottom wall and front wall, the front walls having an opening at each end and a central entrance opening, a door for closing each end opening slidably mounted for transverse movement across the front walls adapted to close the central opening when the doors are moved to uncover the end openings, said units being disposed in superposed relation with the adjoining edges of the end walls having flanges disposed in meeting relation and joined together, means on the uppermost unit for hingedly suspending the units from the wall of the chicken house, cleaning doors pivotally mounted on the rearward edge of the end walls of said units adjacent the bottom wall adapted to swing outwardly from the rear of the units for engagement with the supporting wall when the units are swung outwardly from the wall.

3. In a nesting box, the combination with a vertical supporting wall, of a structure having end walls, a bottom wall and front wall, the front wall having openings therein, hangers at the rearward upper corners of the end walls for hingedly connecting said structure to said supporting wall to allow outward swinging movement of said structure, and cleaning doors hingedly mounted on the rearward edges of the end walls above the bottom wall for swinging movement in an outward and upward direction for engagement with said supporting wall to hold said structure in an outwardly swung position.

FRANK J. KUMMETH.

REFERENCES CITED

The following references are of record in the file of this patent:

UNITED STATES PATENTS

| Number | Name | Date |
|---|---|---|
| 1,101,427 | Gaeth | June 23, 1914 |
| 1,130,095 | McIntyre | Mar. 2, 1915 |
| 1,319,460 | Brown | Oct. 21, 1919 |
| 1,519,518 | Thor et al. | Dec. 16, 1924 |
| 1,610,220 | Olson | Dec. 7, 1926 |
| 1,674,193 | Coltrin | June 19, 1928 |
| 1,827,944 | Krogstad | Oct. 20, 1931 |
| 1,847,740 | Woods | Mar. 1, 1932 |
| 1,914,160 | Pine | June 13, 1933 |
| 1,923,980 | Hultine | Aug. 22, 1933 |